(12) United States Patent
Ito et al.

(10) Patent No.: US 6,408,089 B1
(45) Date of Patent: Jun. 18, 2002

(54) DEVICE, METHOD AND RECORDING MEDIUM FOR VIDEO INSPECTION

(75) Inventors: Takayuki Ito; Mahito Fujii; Mutsuo Yamaga; Simon Clippingdale, all of Tokyo (JP)

(73) Assignee: Nippon Hoso Kyokai, Tokyo (JP)

( * ) Notice: Subject to any disclaimer, the term of this patent is extended or adjusted under 35 U.S.C. 154(b) by 0 days.

(21) Appl. No.: 09/201,868

(22) Filed: Nov. 30, 1998

(30) Foreign Application Priority Data

Mar. 2, 1998 (JP) .......................................... 10-049805

(51) Int. Cl.[7] ................................................ G06K 9/00
(52) U.S. Cl. ...................... 382/141; 382/103; 382/181; 382/191; 382/210; 348/92; 348/135; 348/136; 348/169; 358/453; 358/454
(58) Field of Search ................................. 382/141, 152, 382/154, 209, 210, 181, 191; 345/429, 432; 348/92, 125, 129, 130, 135, 136, 137, 169; 358/454, 453

(56) References Cited

U.S. PATENT DOCUMENTS

| 5,191,413 | A | | 3/1993 | Edgar ......................... 358/105 |
| 5,546,125 | A | * | 8/1996 | Tomitaka et al. ........... 348/169 |
| 5,636,296 | A | | 6/1997 | Kaneko et al. ............. 382/276 |
| 5,774,574 | A | * | 6/1998 | Hoki .......................... 348/128 |
| 6,014,183 | A | * | 1/2000 | Hoang ........................ 348/700 |
| 6,124,884 | A | * | 9/2000 | Fujii et al. .................. 348/135 |
| 6,173,071 | B1 | * | 1/2001 | Wasserman et al. ........ 382/147 |
| 6,215,895 | B1 | * | 4/2001 | Sali et al. ................... 382/141 |
| 6,259,474 | B1 | * | 7/2001 | Sera ............................ 348/82 |

* cited by examiner

*Primary Examiner*—Leo Boudreau
*Assistant Examiner*—Sheela Chawan
(74) *Attorney, Agent, or Firm*—Workman, Nydegger & Seeley

(57) ABSTRACT

A device is provided which detects image patterns which may cause photosensitive attacks, based on the contrast intensity and values of frequency bands having a peak value. A frame image constituting video is image analyzed for contrast intensity and spatial frequency, in the contrast detector and the peak seeker respectively.

24 Claims, 4 Drawing Sheets

DEVICE, METHOD AND RECORDING MEDIUM FOR VIDEO INSPECTION

This application is based on Patent Application No. 49805/1998 filed on Mar. 2, 1998 in Japan, the content of which is incorporated hereinto by reference.

BACKGROUND OF THE INVENTION

1. Field of the Invention

The present invention relates to a device for monitoring images for specific types of patterns by analyzing video such as television pictures; more specifically the present invention relates to a device, method and recording medium for video inspection suitable for detecting images which contain periodic patterns of high contrast such as striping, checker, concentric, radial, or swirl patterns, covering more than a predetermined area.

2. Description of the Prior Art

It is known that images containing periodic patterns, such as striping, checker, concentric, radial, or swirl patterns having high contrast, may induce seizures when viewed by a photosensitive person.

In order to detect images (video frames) containing such patterns as striping, checker, concentric, radial, or swirl patterns from within a video sequence, an inspector either had to visually check the actual video displayed on a display device (a monitor) or to visually check a display on a waveform monitor.

Detecting images containing such patterns as described above by visually checking takes much time. The inspector(s) may also potentially be affected in his/her health by viewing video including the type of pattern forms mentioned above. Furthermore, this may cause a problem in that different inspectors may have different judgements on the same subject by the nature of personal error or variation.

SUMMARY OF THE INVENTION

An object of the present invention is to provide a device, method and recording medium for video inspection capable of automatically detecting images displayed in high contrast with patterns of specific forms contained in video pictures.

In accordance with the present invention, the video inspecting device provides input means for inputting a video subject to be inspected; image analyzer means for analyzing images in each frame of the inputted video subject with respect to both contrast and spatial frequency thereof; image processor means for computing, according to the result of the image analysis, a ratio between the entire image area and the part of image in which the intensity of the contrast and the frequency range of the peak values of the spatial frequency are out of allowable tolerance range respectively; and decision means for determining that the image in a frame is of the specific class to be detected if the computed ratio is not within the allowable tolerance range.

In accordance with the present invention, the video inspecting device may further comprise output means for outputting the result of decision from the decision means.

In accordance with the present invention, the video inspecting device may further comprise means for replacing the specific class of image included in the video subject with a substitute image or images, if the specific class of image to be detected is detected by the decision means.

In accordance with the present invention, the video inspecting device may further comprise means for eliminating the specific class of image included in the video subject, if the specific class of image to be detected is detected by the decision means.

In accordance with the present invention, video output from a video display device may be inputted to the video inspecting device as the video subject to be inspected.

In accordance with the present invention, video output from a video playback device may be inputted to the video inspecting device as the video subject to be inspected.

In accordance with the present invention, video output from a TV game machine may be inputted to the video inspecting device as the video to be inspected.

In accordance with the present invention, the frame is divided into a plurality of blocks, the image analyzer means performs the image analysis for each of the blocks, the image processor means determines whether or not each of the results of the image analysis is within the allowable range, and the ratio between the total area of the blocks that have been determined not to be within the allowable range and the area of a frame may be computed as the ratio of the part of image being out of the allowable range to the entire image.

In accordance with the present invention, a video inspection method provides the steps of inputting a video subject to be inspected, image analyzing each of the frame images of the inputted video with respect to both contrast and spatial frequency thereof; computing, according to the result of the image analysis, the ratio between the entire image area and the part of image in which the intensity of the contrast and the frequency range of the peak values of the spatial frequency are out of allowable tolerance range respectively; and determining that the image in the frame is of the specific class one to be detected if the computed ratio is not within the allowable tolerance range.

In accordance with the present invention, the video inspection method may further comprise the step of outputting the result of decision from the decision means.

In accordance with the present invention, the video inspection method may further comprise the step of replacing the specific class of image included in the video subject with another prepared substitute image or images if the specific class of image to be detected is detected.

In accordance with the present invention, the video inspection method may further comprise the step of eliminating the specific class of image included in the video subject, if the specific class of image to be detected is detected.

In accordance with the present invention, the video inspection method may further comprise the step of inputting video output from a video display device as the video subject to be inspected.

In accordance with the present invention, the video inspection method may further comprise the step of inputting video output from a video playback device as the video subject to be inspected.

In accordance with the present invention, the video inspection method may further comprise the step of inputting video output from a TV game machine as the video subject to be inspected.

In accordance with the video inspection method of the present invention, the frame is divided into a plurality of blocks, the video inspection method may further comprise the step of performing the image analysis for each of the blocks, determining whether or not each of the results of the image analysis is within an allowable range, and computing the ratio between the total area of the blocks that have been determined not to be within the allowable tolerance range and the area of the frame as the ratio of the part of image being out of the allowable tolerance range to the entire image.

In accordance with the present invention, a recording medium is provided which is equipped in a video inspection device and on which a program readable by a computer is stored, the program provides the steps of inputting a video subject to be inspected; analyzing images in each frames in the inputted video with respect to both contrast and spatial frequency thereof; computing, according to the result of the image analysis, the ratio between the entire image area and the part of image in which the intensity of the contrast and the frequency range of the peak values of the spatial frequency are out of allowable tolerance range respectively; determining that the image in the frame is of the specific class to be detected if the computed ratio is not within the allowable tolerance range.

In accordance with the present invention, the program may further comprise the step of outputting the result of decision.

In accordance with the present invention, the program may further comprise the step of replacing the specific class of image included in the video subject with other prepared substitute image or images if the specific class of image to be detected is detected in the determining step.

In accordance with the present invention, the program may further comprise the step of eliminating the specific class of image included in the video subject, if the specific class of image to be detected is detected in the determining step.

In accordance with the present invention, the program may further comprise the step of inputting video output from a video display device as the video subject to be inspected.

In accordance with the present invention, the program may further comprise the step of inputting video output from a video playback device as the video subject to be inspected.

In accordance with the present invention, the program may further comprise the step of inputting video output from a TV game machine as the video subject to be inspected.

In accordance with the present invention, the frame is divided into a plurality of blocks, the program may comprise the steps of performing image analysis on each of the blocks in the image analysis step; determining whether or not each of the results obtained from the image analysis on respective block are within an allowable range in the computing step; computing the ratio between the total area of the blocks that have been determined not to be within the allowable range and the area of the frame as the ratio of the part of image being out of the allowable range to the entire image, in the computing step.

In accordance with the present invention, images with patterns of some specific form which may affect the viewing individuals may be automatically detected from within a video stream, by performing image analysis on each image in a frame in a video subject to be inspected with respect to both contrast and spatial frequency thereof, and detecting frames having large image area displayed in which the intensity of the contrast and the frequency range of the peak values of the spatial frequency are out of allowable tolerance range respectively.

In accordance with the present invention, the decisive results of decision means, i.e., the indication of presence or absence of some specific class of image patterns may be output, thereby according to the result output, the specific class of image patterns may be edited or removed by means of image editor later.

In accordance with the present invention, if images of the specific class to be detected are detected by the decision means (or decision step), the images may be automatically substituted by other replacing images previously prepared, so that no human attendant is required to inspect any potentially provocative images. Therefore not only viewers but also video production staff will be protected from potentially harmful images.

In accordance with the present invention, if images of the specific class to be detected are detected by the decision means (step), the viewer as well as video production staff will be protected.

In accordance with the present invention, the output video from a video display device, video playback device, and TV game machine may be inspected.

In accordance with the present invention, the processing time will be shortened by carrying out the image analysis block by block in comparison to the image analysis of the entire frame at once.

In accordance with the present invention, the probability of onset of photosensitive attacks among viewers will be minimized by inspecting for image patterns in the video which are known to cause such photosensitive attacks prior to the on-air broadcast of a program.

Furthermore, these potentially harmful image patterns are automatically checked without human attendance, allowing faster and quicker inspection than the inspection of the prior art by human inspectors, and no deviation of inspection accuracy due to personal error of variation. More importantly, the present invention requires no inspector to be attendant at inspection, allowing production cost to be reduced and workers to be protected from potentially harmful video at the same time. When the video inspecting device is attached or incorporated to commercially available video generating devices such as video tape recorders and TV game machines, the video inspecting device of the present invention enables to checking for and warning of possibly harmful images which may induce photosensitive attacks among viewers.

The above and other objects, effects, features and advantages of the present invention will become more apparent from the following description of embodiments thereof taken in conjunction with the accompanying drawings.

BRIEF DESCRIPTION OF THE DRAWINGS

The present invention will be fully understood by carefully reading the following detailed description of the preferred embodiments of the present invention with reference to the accompanying drawings, in which.

DETAILED DESCRIPTION OF THE PREFERRED EMBODIMENTS

The preferred embodiments of the present invention will be described in greater detail hereinbelow with reference to the accompanying drawings.

First Embodiment

Figure 1A:
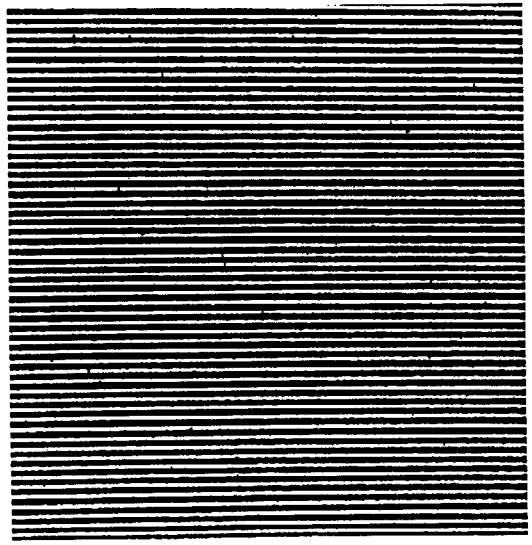
FIGS. 1A–1D are schematic diagrams showing image patterns typical of those which may cause photosensitive attacks in susceptive individuals.
Figure 1B:
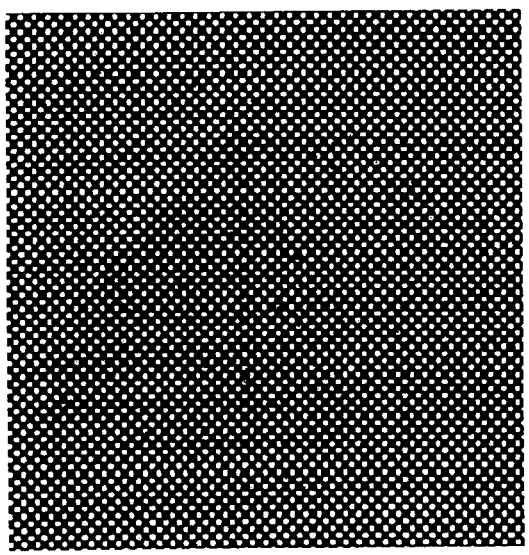
Figure 1C:
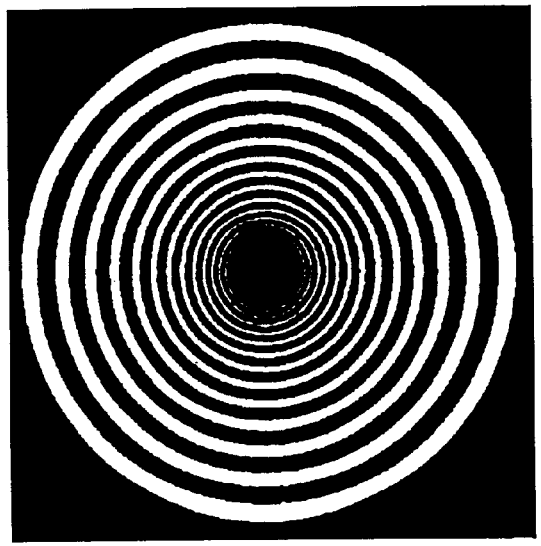
Figure 1D:
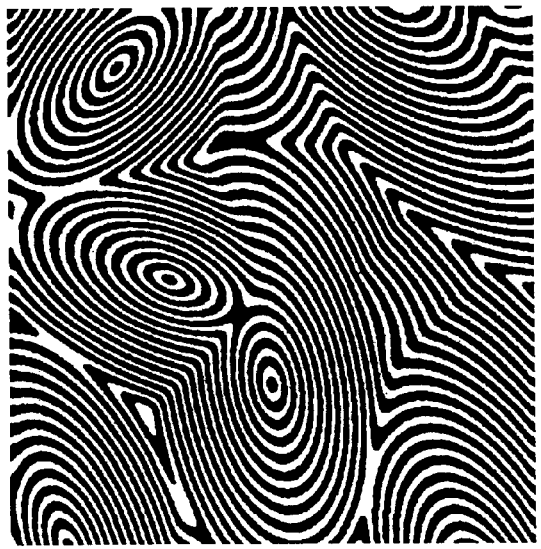

Some examples of pattern forms to be detected in images are shown in FIGS. 1A–1D. FIG. 1A shows a vertical stripe pattern. FIG. 1B shows a checker pattern. FIG. 1C shows a concentric pattern; and FIG. 1D shows a whorl pattern. All of these patterns are locally periodic (repetitive) in at least one direction. The inventor(s) of the present invention have found that, when performing frequency analysis, for example, by the Fast Fourier Transformation (FFT), there is an acute peak in that portion at a particular spatial frequency (first condition). The inventors also have found that a high contrast image is characterized by large alternating current energy (second condition). Based on these findings, in this preferred embodiment, an entire image is divided into a plurality of small blocks, then it is determined whether the image in each block satisfies the two conditions described above. Thereafter the image will be judged to belong to the specified class of images if the ratio between the area occupied by the blocks satisfying both the first and second conditions as described above and the area of the entire image exceeds a predefined value.

Figure 2:
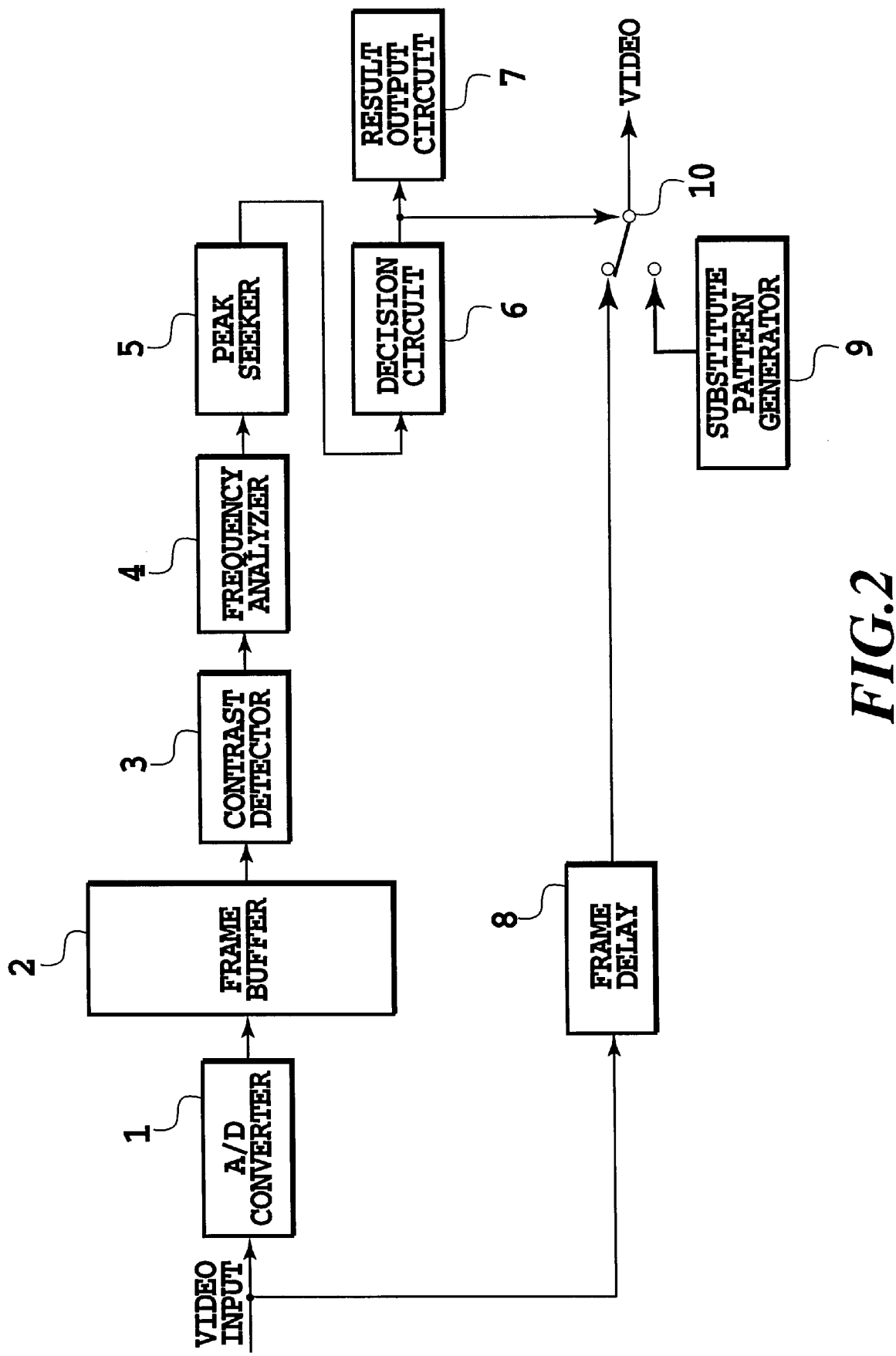
FIG. 2 is a schematic block diagram showing a system architecture of the first preferred embodiment according to the present invention.

A system architecture of the video inspection device using such video inspection method as described above is shown in FIG. 2. In FIG. 2, reference numeral 1 designates an analog/digital (A/D) converter for analog to digital conversion. Reference numeral 2 designates a frame buffer for temporary storage of one screenful (frame) of image data (brightness data in this embodiment). Reference numeral 3 designates a contrast detector for analyzing the image data to determine whether or not its contrast is within an allowable tolerance range.

Reference numeral 4 designates a frequency analyzer, which analyzes frequency within each divided block according to the image data stored in the frame buffer 2 if the result from contrast detector 3 is out of range. Reference numeral 5 designates a peak seeker, which determines whether or not the peak indicated by the frequency analysis results of each block falls within into a predefined frequency band, characterizing the class of image patterns to be detected. Reference numeral 6 designates a decision circuit for summing, based on the results of each block obtained from the peak seeker 5, the area (or the number) of blocks containing an acute peak (blocks determined by the peak seeker 5 in which the peak value is within a predefined frequency range) to compute the ratio between the summed area and the screen size (or the ratio between the number of blocks having a peak and the total number of blocks constituting the full-screen image). If this ratio is out of range, the image represented by the image data in the frame buffer 2 is determined to belong to the class of images to be detected.

The result output circuit 7 outputs the result from the decision circuit 6. Various output modes, such as simple alarm of a light, display of character messages, output of the frame number along with the result through a printer, and so on, may be employed.

Reference numeral 8 is a frame delay, which delays the input video signal so as to synchronize it with the image processing system which consists of circuits from 1 through 6. Reference numeral 9 is a substitute pattern generator which generates image patterns for replacement. Non-volatile memory such as read-only memory (ROM) may be used for the substitute pattern generator 9.

Reference numeral 10 designates a switch, which outputs image signals of the image pattern generated by the substitute pattern generator 9, instead of outputting video signals derived from the frame delay 8, i.e., the image to be inspected, in the case in which the decision circuit 6 detects one of the pattern forms exemplified in FIGS. 1A–1D, in order to replace patterns such as are shown in FIGS. 1A–1D contained in the video signal with a replacement image pattern. When the signal from the decision circuit 6 indicating the presence of one of the sought class of patterns is not generated, video signals from the frame delay 8 will be output.

It should be noted that the system as mentioned above may be alternatively embodied by using for example an image processor or a personal computer. In such a case, the process performed in the contrast detector 3, the frequency analyzer 4, the peak seeker 5, the decision circuit 6, the frame delay 8, and the switch 10 may be written as a software program to be executed by a CPU to provide the functionality of the circuitry as mentioned above. It will be appreciated by those skilled in the art that the above circuitry may be constructed with digital circuits as well.

The detection of specific types of image pattern carried out by the above system will be now described hereinbelow in greater detail.

Video signals are inputted to the device through a video input means such as a connector (not shown) in the form of analog signals comprised of frames of images, such as NTSC signals. The A/D converter 1 converts from analog input video signals to digital video signals to input to the frame buffer 2. In this embodiment an entire image (frame) is divided into small blocks of M (in the abscissa axis direction) by N (in the ordinate axis direction). Thereafter the blocks are processed one by one, and the next frame will be captured at the time when all processing on every block in one frame is complete.

In contrast detector 3, the variance $\sigma^2$ of brightness of all pixels (picture elements) in one small block is determined by using the following expression:

$$\sigma^2 = \sum_{ij} I_{ij}^2 / N - \left\{ \sum_{ij} I_{ij} / N \right\}^2 \tag{1}$$

wherein $I_{ij}$ refers to the brightness of a pixel located in the position (i,j) in that block. This corresponds to the total energy of alternating current components of the image in that block. If this value exceeds a predefined threshold value $\sigma 1$, i.e., if this value is out of allowable tolerance range, then the contrast detector 3 determines that this small block is a high contrast block, and sends the image data for that block to the succeeding stage, the frequency analyzer 4.

As another means for accomplishing the functionality of the contrast detector 3, the sum of edge intensities obtained by passing through a differential filter such as a sobel filter may be divided by the number of pixels constituting edges to obtain an "average edge intensity" to compare with a threshold.

In the frequency analyzer 4, the image data transferred from the contrast detector 3 is subjected to a Fourier transform which resolves it into spatial frequency components in order to derive an energy for each spatial frequency.

The result $F_{\mu\nu}$ of the Fourier transform of the image data of each block is comprised of a real number part $R\{F_{\mu\nu}\}$ and an imaginary number part $I\{F_{\mu\nu}\}$, where $\mu$ and $\nu$ indicate spatial frequencies in the horizontal direction and the vertical direction, respectively.

The energy $E_{\mu\nu}$ of each frequency component may be expressed as follows:

$$E_{\mu\nu} = (R\{F_{\mu\nu}\})^2 + (I\{F_{\mu\nu}\})^2 \tag{2}$$

In the peak seeker 5, the spatial frequency spectrum in each respective block is examined to determine whether or not it contains an acute peak in the predefined frequency range f1–f2. A peak is defined to be acute if it satisfies either or both of the following conditions:

1. a maximum value other than for the direct current component is detected in a block, and the value thereof exceeds a predefined value θ2 with respect to the total alternating current energy in that block; and/or
2. a maximum value exceeds a predefined value θ3 when adding values of eight neighbor components surrounding the one having the maximum, even though the maximum detected in that block does not satisfy condition (1) above.

In decision circuit 6, the total area of the blocks having an acute peak is determined. If the ratio between the total area of these blocks and the area of the complete image (frame) exceeds a predefined threshold value θ4, then that image is determined to be an image containing one of the class of respective patterns to be identified (pattern forms exemplified in FIGS. 1A–1D).

The result output circuit 7 displays the status of detection according to the results of the decision circuit 6, i.e., an image pattern of the class to be identified has been detected.

An ON/OFF signal indicating existence or absence of the class of patterns to be detected causes the switch 10 to change connection. If an image pattern of the class to be detected is determined to be present, the substitute pattern image generated by the substitute pattern generator 9 will be output so as to replace detected pattern images such as those shown in FIGS. 1A–1D. Since the video signals (frame images) are delayed by the frame delay 8 by at least the period of time necessary from the input to the decision, the replacement of pattern images may be executed at the time of detection.

In the frequency analyzer 4, if an original image is shrunk to ½, ¼, ⅛, . . . and Fourier Transform is applied thereon, the spatial frequency range which may be inspected is changeable. Furthermore, the Fourier Transform can be processed in a shorter time because of the reduced amount of image data to be processed. For the frequency analysis, image analyzing methods such as Wavelet Transform, Multiple Resolution Fourier Transform, or Hough Transform may be used instead of the Fourier Transform.

The thresholds θ1, θ2, θ3, θ4, f1 and f2 as mentioned above, which are conditions for the pattern detection, such as the contrast intensity for example, may be fixed. Alternatively, these thresholds may be set adjustably by manually entering parameter data from an input device (not shown) such as a numeric keypad.

Second Embodiment

Figure 3:
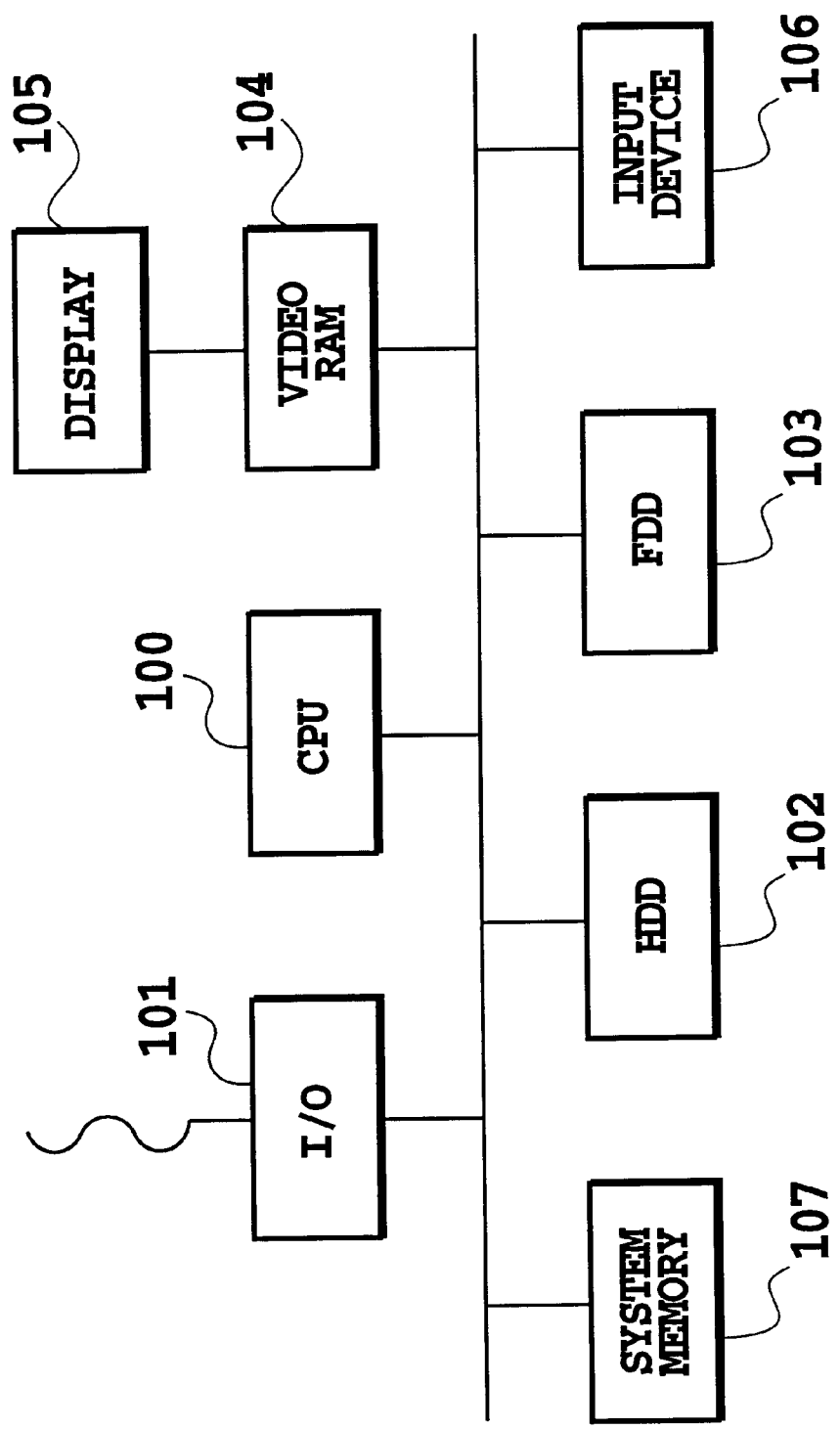
FIG. 3 is a schematic block diagram showing a system architecture of the second preferred embodiment according to the present invention.

The second embodiment of the present invention implementing the visual inspection device by an image processing device will be described below in greater detail. The system arrangement of the second embodiment of the present invention is shown in FIG. 3. Well known information processing devices such as personal computers can be used for the image processing device. It should be noted that the processing procedure (software program, see FIG. 4) is different from that above. The software program for video inspection is written in a language readable by a computer, and installed to the image processing device via a recording medium such as floppy diskette or CD-ROM.

In FIG. 3, a CPU 100, an interface (I/O) 101, a hard disk drive (HDD) 102, a floppy diskette drive (FDD) 103, a video RAM 104, an input device 106, and a system memory 107 are connected to a bus. The CPU 100 controls the entire system, under the control of the operating system (OS) stored in the system memory 107 and hard disk drive 102. The interface 101 is also known as a graphics board, which sequentially captures video signals in the form of NTSC standard on frame-by-frame basis, to convert to digital signals that the CPU 100 can process. Various video signal generators such as television receiver sets, video cameras, video cassette recorders, and TV game machines can be used.

The hard disk drive 102 stores, in addition to the operating system, some software programs for video inspection according to the present invention, and some software programs for creating and editing moving pictures.

The floppy diskette drive 103 accepts a floppy diskette, and reads software program stored thereon for video inspection as mentioned above under the control of the CPU 100. The video RAM 104 stores one frame of image data. Writing image data into video RAM 104 is performed by the CPU 100, image data will be read out therefrom by a controller (not shown) in a display 105 for display on the screen of the display 105.

The input device 106 includes a mouse and a keyboard. The input device 106 is used for inputting various commands to the CPU 100 and miscellaneous information for execution of the software programs.

The system memory 107 includes ROM and RAM. The system memory 107 is used as storage for storing part of the OS, as well as working space for storing data required by the OS and software programs, and storage of programs executed by the CPU 100.

Figure 4:
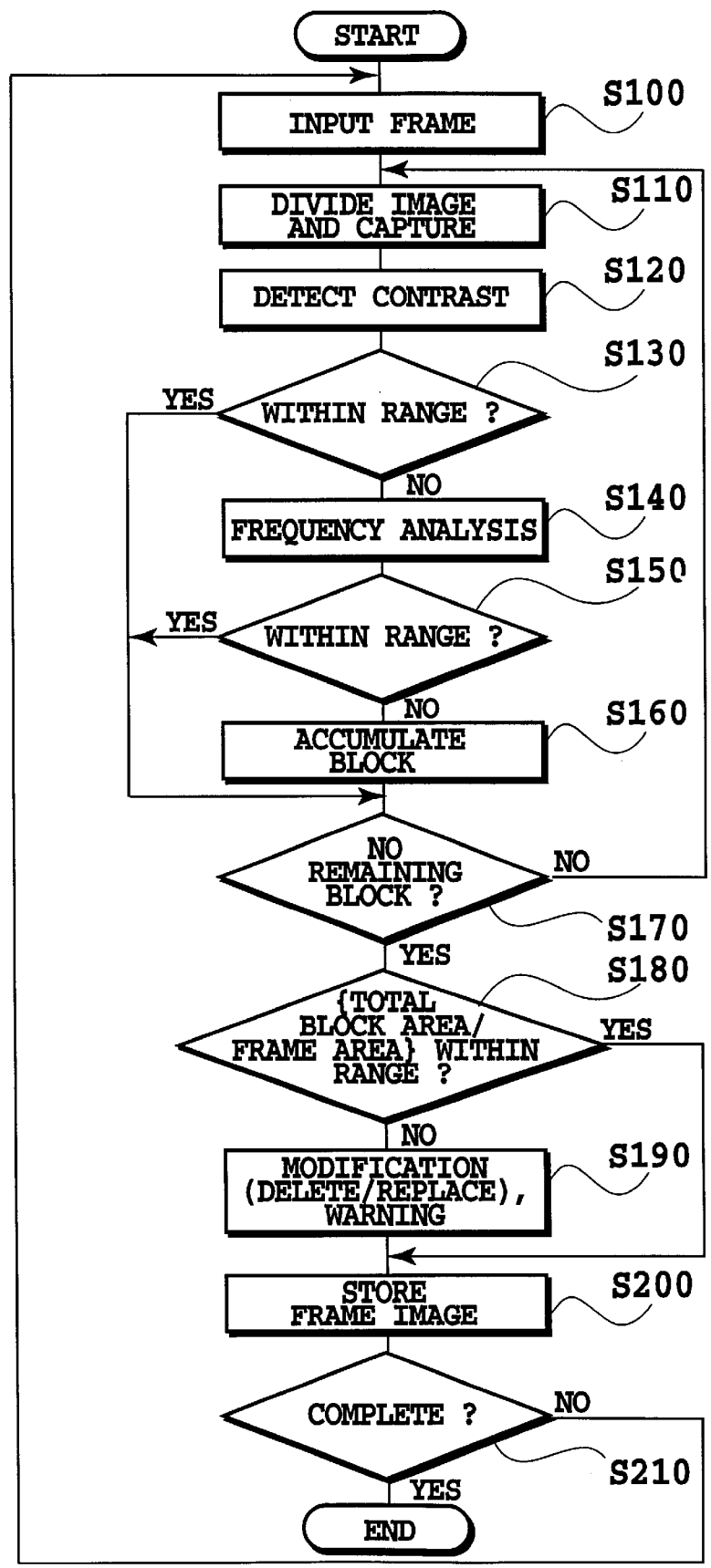
FIG. 4 is a flowchart illustrating the process of the second preferred embodiment according to the present invention.

The video inspection process executed in this system arrangement will be now described below in greater detail, with reference to FIG. 4. The process shown in FIG. 4 is written in a programming language executable by the CPU 100 and installed in the hard disk drive 102. By instructing through the input device 106, the process is loaded into the system memory 107 and executed by the CPU 100. For the purpose of explanation of the embodiment, the software program which is shown in FIG. 4 is decomposed into several process routines known in the prior art. It is to be noted that one of those skilled in the art will be able to write such a software program with or without exact source codes written in a particular programming language.

When instructed via the input device 106 to start the execution of the process shown in FIG. 4, the CPU 100 captures a frame image (one screenful image data) from the I/O 101 to write into the system memory 107 (step S100).

Then the CPU 100 divides the frame image stored in the system memory 107 into, for example, eight blocks. The CPU 100 picks up first block of the image data to compute the contrast intensity according to expression (1). It is determined whether or not the contrast intensity is within an allowable tolerance range (step S130). If the contrast is out of range, the process proceeds from step S130 to step S140 to perform frequency analysis.

If the contrast falls within the range, the process proceeds from step S130 through S170 to S110 to perform contrast computation of second block.

In frequency analysis in step S140, first block of image data is used for frequency analysis. It is determined whether or not the peak energy value obtained from expression (2) falls into the frequency range (tolerance range) indicative of the class of image patterns exemplified in FIGS. 1A–1D.

If the peak falls within the range, then the process proceeds from step S150 through S170 to S110 to perform contrast computation of the second block. If not, the frame being inspected is determined to contain part of one of the class of image patterns exemplified in FIGS. 1A–1D. Then the area of the first block is stored in the system memory 107 for accumulation (summation) of areas (step S160).

Next, the process proceeds from step S170 to S110 to perform contrast inspection and frequency inspection of the second block. If the second block is determined to be out of range in both inspections, the area is accumulated. Then the process repeats those steps of video inspection for all remaining blocks (YES decision in step S170), the CPU 100 computes the ratio between the accumulated surface area and the frame area to determine whether the ratio falls within a tolerance range (step S180). If the ratio is out of range, i.e., frame subject to be inspected is determined to contain any of the class of image patterns exemplified FIGS. 1A–1D, the CPU 100 modifies the frame image stored in the system memory 107 (frame image loaded from the I/O 101). The modification may be either replacement thereof with a substitute image pattern previously created and stored in the HDD 102, or replacement with a warning frame indicating that one of the class of image patterns exemplified in FIGS 1A–1D lies in that frame, or elimination of the input frame image in the I/O 101.

Then, the modified frame image will be stored in the HDD 102 for example in the MPEG (Motion Picture Expert Group) file format for moving video. If the frame image being inspected is determined not to contain any one of the class of image patterns exemplified in FIGS. 1A–1D (i.e., YES decision in step S180), the frame image loaded from the I/O 101 and stored in the system memory 107 will be written into HDD 102. By repeating the process above to the end of input video (looping step S100 to S210), videos (moving pictures) made of a plurality of frames (still images) may be inspected.

In this mode of preferred embodiment, inspected video may be output to external devices by means of a floppy diskette, magneto-optical disks (MO disks) or communication interface (not shown) if desired, since images are stored in the system.

Optionally, following embodiments may be achieved in addition to or in lieu of the above exemplary preferred embodiment according to the present invention.

1). Instead of frame delay 8 in FIG. 2, frame buffers may be used.

2). The video subject to be inspected by the video inspection device shown in FIG. 2 is not limited to television video, various videos such as video output from a VCR, video created on a computer (so-called movies) can be dealt with. For example, A/D converter 1 shown in FIG. 2 is not required when digital video is to be dealt with.

3). The video inspection device of FIG. 2 may be removably connected by means of signal wirings to a video generating device (for example, a video image display such as television receiver, video player such as Video Cassette Recorder, 8 mm Video (camera), TV game machine, proprietary game machine, and so on) to accept output images from the video generating device, or alternatively, may be incorporated into a video generating device to receive video signal subject to be inspected from within the video generating device.

4). In the above mentioned preferred embodiment, image patterns such as those exemplified in FIG. 1 are replaced with a substitute image pattern when detected. However, it may be possible to simply warn when detecting such an image pattern. Alternatively it may be possible to only provide substitution functionality (the substitute pattern generator 9) without the result output circuit 7. Also, the substitute feature and warning output feature may be arbitrarily added in compliance with its application.

5). In the above mentioned preferred embodiment, although image patterns typified by FIGS. 1A–1D are replaced with a substitute image pattern once detected, the system shown in FIG. 2 allows detected image patterns to be eliminated from within inputted video. In such a case, the substitute pattern generator 9 is not provided. When any one of the type of patterns shown in FIGS. 1A–1D is detected, the switch 10 is disconnected (turned off) from the frame delay 8 so as not to externally output delayed images in the frame delay 8. At the time when a new frame image arrives the switch 10 is connected (turns on) to the frame delay 8, so that frame images other than those exemplified by FIGS. 1A–1D will be output through switch 10.

Although the present invention has been described by way of example in its preferred embodiment with a certain degree of particularity, the embodiments above are for illustrative purpose only and not limitative. It should be understood by those skilled in the art that many changes, modification and variation can be made in the light of the above teachings without departing from the spirit and scope of the present invention, and that the scope of the present invention is therefore limited only by the following claims.

What is claimed is:

1. A video inspecting device for determining whether an image belongs to a specified harmful class known to be capable of inducing adverse reaction when viewed by photosensitive people, the video inspecting device comprising:

input means for inputting a video subject to be inspected;

image analyzer means for analyzing the image in each frame in the inputted video subject with respect to both contrast and spatial frequency thereof;

image processor means for computing, according to the result of the image analysis, a ratio between the entire image area and the part of the image in which the intensity of said contrast and the frequency range of the peak values of said spatial frequency are out of allowable tolerance range respectively; and decision means for determining that an image in the frame belongs to the specified class to be detected if the computed ratio is not within the allowable tolerance range.

2. A video inspecting device as claimed in claim 1, further comprising:

output means for outputting the result of the decision from said decision means.

3. A video inspecting device as claimed in claim 1, further comprising:

means for replacing the specific class of image included in said video subject with a substitute image of images, if the specific class of image to be detected is detected by the decision means.

4. A video inspecting device as claimed in claim 1, further comprising:

means for eliminating said specific class of images included in said video subject, if the specific class of image to be detected is detected by the decision means.

5. A video inspecting device as claimed in claim 1, wherein video output from a video display device is inputted to the video inspecting device as the video subject to be inspected.

6. A video inspecting device according to claim 1, wherein video output from a video playback device is inputted to the video inspecting device as the video subject to be inspected.

7. A video inspecting device as claimed in claim 1, wherein video output from a game machine is inputted to the video inspecting device as the video subject to be inspected.

8. A video inspecting device as claimed in claim 1, wherein said frame is divided into a plurality of blocks, said image analyzer means performs said image analysis for each of the blocks, said image processor means determines whether or not each of the results of the image analysis is within an allowable range, and the ratio between the total area of the blocks that have been determined not to be within the allowable range and the area of the frame is computed as the ratio of said part of image being out of said allowable tolerance range to the entire image.

9. A video inspecting method for determining whether an image belongs to a specified harmful class known to be capable of inducing adverse reaction when viewed by photosensitive people, the video inspecting method comprising the steps of:

inputting a video subject to be inspected;

image analyzing each of the inputted video subject with respect to both contrast and spatial frequency thereof;

computing, according to the result of the image analysis, a ratio between the entire image area and the part of image in which the intensity of said contrast and the frequency range of the peak value of said spatial frequency are out of allowable tolerance range respectively; and determining that the image in the frame is of the specific class to be detected if said computed ratio is not within the allowable tolerance range.

10. A video inspecting method as claimed in claim 9, further comprising the step of;

outputting the result of decision from said decision.

11. A video inspecting method as claimed in claim 9, further comprising the step of;

replacing said specific class of image included in said video subject with another prepared substitute image if the specific class of image to be detected is detected.

12. A video inspecting method as claimed in claim 9, further comprising the step of;

eliminating the specific class of image included in said video subject, if the specific class of image to be detected is detected.

13. A video inspecting method as claimed in claim 9, further comprising the step of;

inputting video output from a video display device as the video subject to be inspected.

14. A video inspecting method as claimed in claim 9, further comprising the step of;

inputting video output from a video playback device as the video subject to be inspected.

15. A video inspecting method as claimed in claim 9, further comprising the step of;

inputting video output from a game machine as the video subject to be inspected.

16. A video inspecting method as claimed in claim 9, wherein said frame is divided into a plurality of blocks, said method further comprising the steps of:
performing the image analysis for each of the blocks;
determining whether or not each of the results of the image analysis is within an allowable range; and
computing the ratio between the total area of the blocks that have been determined not to be within the allowable tolerance range and the area of the frame as the ratio of said part of image being out of said allowable tolerance range to the entire image.

17. A recording medium for incorporating in a video inspection device and for storing a program readable by a computer for determining whether an image belongs to a specified harmful class known to be capable of inducing adverse reaction when viewed by photosensitive people, said program comprising the steps of:

inputting a video subject to be inspected;

analyzing the image in each frame in the inputted video with respect to both contrast and spatial frequency thereof;

computing, according to the result of the image analysis, a ratio between the entire image area and the part of image in which the intensity of said contrast and the frequency range of the peak value of said spatial frequency are out of allowable tolerance range respectively;

determining that an image in the frame is of the specific class to be detected if the computed ratio is not within the allowable tolerance range.

18. A recording medium as claimed in claim 17, wherein the program further comprises the step of:

outputting the result of decision from the determining step.

19. A recording medium as claimed in claim 17, wherein the program further comprises the step of;

replacing said specific class of image included in said video subject with another prepared substitute image if the specific class of image to be detected is detected in the determining step.

20. A recording medium as claimed in claim 17, wherein the program further comprises the step of:

eliminating the specific class of image included in said video subject, if the specific class of image to be detected is detected in the determining step.

21. A recording medium as claimed in claim 17, wherein the program further comprises the step of;

inputting video output from a video display device as the video subject to be inspected.

22. A recording medium as claimed in claim 17, wherein the program further comprises the step of;

inputting video output from a video playback device as the video subject to be inspected.

23. A recording medium as claimed in claim 17, wherein the program further comprises the step of:

inputting video output from a game machine as the video subject to be inspected.

24. A recording medium as claimed in claim 17, wherein said frame is divided into a plurality of blocks, the program further comprising the steps of;
performing the image analysis on each of the blocks in the image analysis step;
determining whether or not each of the results obtained from the image analysis on respective block is within an allowable range, in the computing step;
computing the ratio between the total area of the blocks that have been determined not to be within the allowable range and the area of the frame as the ratio of said part of image being out of said allowable range to the entire image, in the computing step.

* * * * *

UNITED STATES PATENT AND TRADEMARK OFFICE
CERTIFICATE OF CORRECTION

PATENT NO. : 6,408,089 B1
DATED : June 18, 2002
INVENTOR(S) : Takayuki Ito et al.

It is certified that error appears in the above-identified patent and that said Letters Patent is hereby corrected as shown below:

Column 5,
Line 6, before "pattern" change "whorl" to -- whirl --

Column 6,
Line 46, before "i.e." change "σ1," to -- θ1, --

Signed and Sealed this

Twenty-fifth Day of March, 2003

JAMES E. ROGAN
*Director of the United States Patent and Trademark Office*